(12) United States Patent
Buss

(10) Patent No.: US 8,793,773 B2
(45) Date of Patent: Jul. 29, 2014

(54) SYSTEM AND METHOD FOR PROVIDING REPUTATION RECIPROCITY WITH ANONYMOUS IDENTITIES

(75) Inventor: Duane Buss, West Mountain, UT (US)

(73) Assignee: Apple Inc., Cupertino, CA (US)

( * ) Notice: Subject to any disclaimer, the term of this patent is extended or adjusted under 35 U.S.C. 154(b) by 1697 days.

(21) Appl. No.: 12/022,518

(22) Filed: Jan. 30, 2008

(65) Prior Publication Data

US 2009/0193520 A1 Jul. 30, 2009

(51) Int. Cl.
*G06F 7/04* (2006.01)
*H04L 29/06* (2006.01)
*G06F 21/30* (2013.01)

(52) U.S. Cl.
CPC ............... *H04L 63/08* (2013.01); *G06F 21/30* (2013.01)
USPC ................ 726/5; 726/19; 726/21; 713/166; 713/168

(58) Field of Classification Search
None
See application file for complete search history.

(56) References Cited

U.S. PATENT DOCUMENTS

| | | | |
|---|---|---|---|
| 7,299,493 B1 | 11/2007 | Burch et al. | |
| 7,316,027 B2 | 1/2008 | Burch et al. | |
| 2002/0046041 A1 | 4/2002 | Lang | |
| 2003/0074215 A1 | 4/2003 | Morciniec et al. | |
| 2004/0210771 A1* | 10/2004 | Wood et al. | 713/201 |
| 2005/0071687 A1 | 3/2005 | Pathakis et al. | |
| 2005/0222850 A1 | 10/2005 | Armano et al. | |
| 2006/0095404 A1 | 5/2006 | Adelman et al. | |
| 2006/0179133 A1 | 8/2006 | Mariani et al. | |
| 2007/0027910 A1 | 2/2007 | Buss et al. | |
| 2007/0061872 A1 | 3/2007 | Carter | |
| 2007/0174406 A1 | 7/2007 | Morris et al. | |
| 2007/0179802 A1 | 8/2007 | Buss et al. | |
| 2007/0179834 A1 | 8/2007 | Carter et al. | |
| 2007/0266006 A1 | 11/2007 | Buss | |
| 2007/0283424 A1 | 12/2007 | Kinser et al. | |
| 2007/0294750 A1 | 12/2007 | Burch et al. | |
| 2008/0021716 A1 | 1/2008 | Buss et al. | |

OTHER PUBLICATIONS

European Search Report for European Patent Application No. 08165164.8, dated Feb. 12, 2009, 2 pages.
Papaioannou, et al., An Incentives' Mechanism Promoting Truthful Feedback in Peer-to-Peer Systems, 2005 IEEE Symposium on Cluster Computing and the Grid, May 9-12, 2005, vol. 1, pp. 275-283.

(Continued)

*Primary Examiner* — Kaveh Abrishamkar
(74) *Attorney, Agent, or Firm* — Novak Druce Connolly Bove + Quigg LLP

(57) ABSTRACT

System and method for providing reciprocity in a reputation system are described. In one embodiment, the method comprises: responsive to receipt by a first entity of a Reputation Guarantee ("RG") request from a second entity, creating a token in accordance with specifications set forth in the RG request and forwarding the token to the second entity, wherein the token may include reputation information developed using reputation forming information ("RFI") of the second entity and policies concerning treatment of the RFI of the second entity; forwarding the token to a third entity by at least one of the first and second entities; responsive to the token received by the third entity not including the reputation information of the second entity: forwarding from the third entity to the first entity the token and an assertion request; and responsive to receipt of the token and the assertion request, forwarding by the first entity to the third entity an assertion including the reputation information in accordance with the policies concerning treatment of the RFI of the second entity.

20 Claims, 3 Drawing Sheets

(56) References Cited

OTHER PUBLICATIONS

Boldt, et al., Preventing Privacy-Invasive Software Using Collaborative Reputation Systems, Secure Data Management, Lecture Notes in Computer Science, 2007, pp. 142-157.

Maximilien, et al., Conceptual Model of Web Service Reputation, ACM Special Interest Group on Management of Data Record, Dec. 2002, vol. 31, Issue 4.

http://www.thefreedictionary.com/reputation, retrieved Nov. 16, 2010.

* cited by examiner

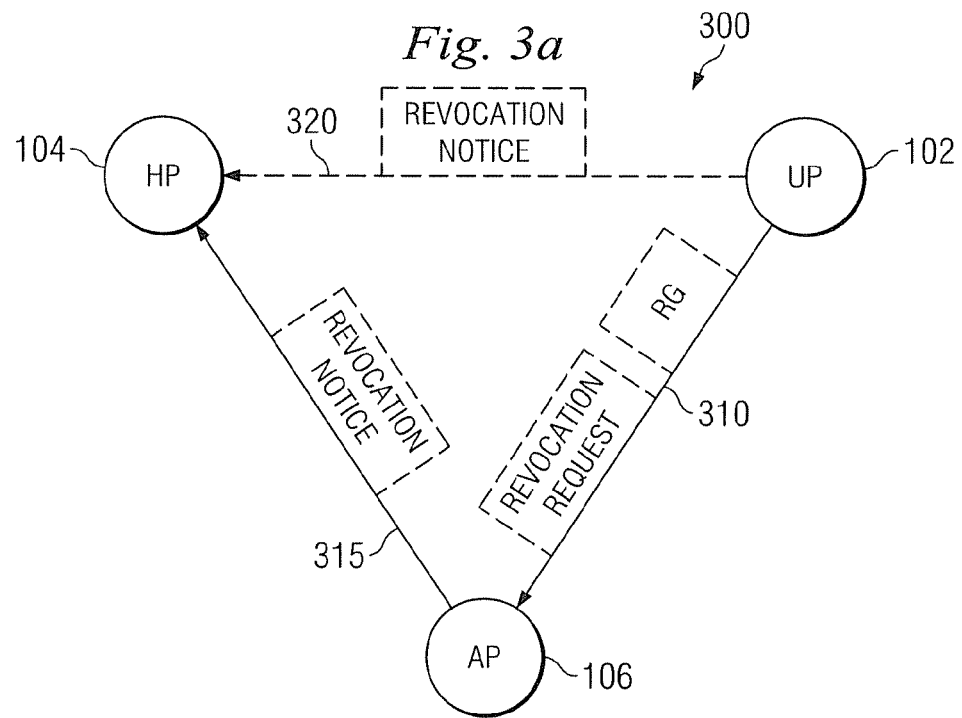
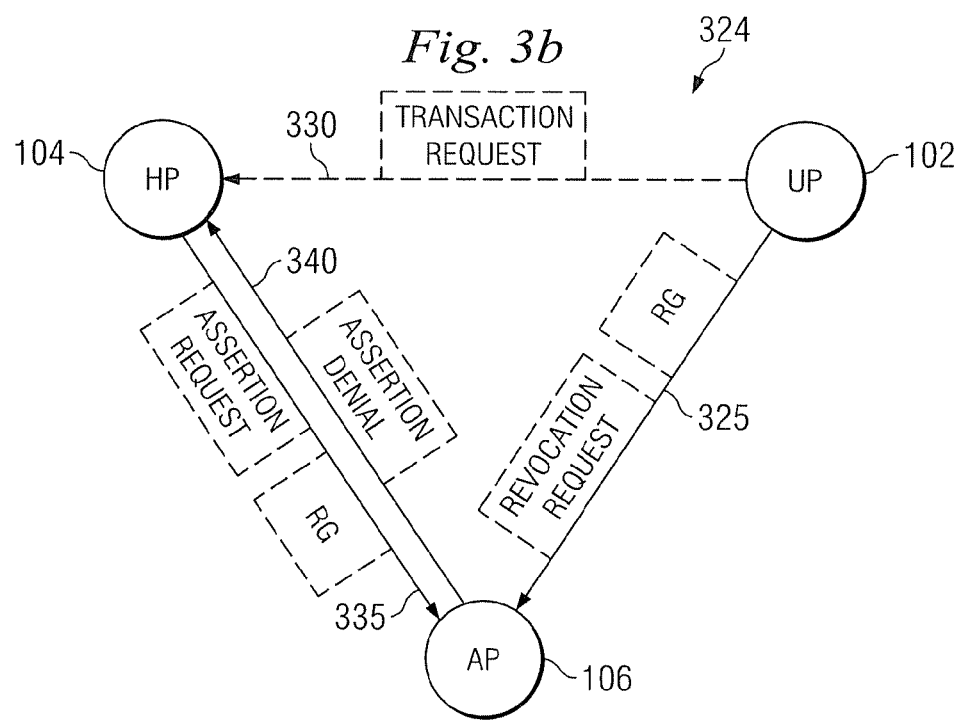

SYSTEM AND METHOD FOR PROVIDING REPUTATION RECIPROCITY WITH ANONYMOUS IDENTITIES

BACKGROUND

The Internet revolution has sparked a host of new communities in which entities may participate. As a result, many transactions that formerly required face-to-face interaction may now be performed in a virtual space. The Internet has opened new markets to vendors and introduced new means of social interaction to individuals. Individuals may choose to transact business using personas within these communities.

As the number of Internet users and transactions have increased, however, so have the number of scams and schemes. As a result, Internet users are becoming increasingly wary of transacting over the Internet with unknown parties. One major factor is the difficulty of tracking the reputation of unknown parties. When a first party interacts with other parties, the history of past interactions informs the first party's current expectations. Consequently, the possibility of a reduction of reputation for poor behavior creates an incentive for good behavior.

Many Internet communities have attempted to deal with this issue by providing localized feedback mechanisms whereby transacting parties can supply feedback tagged to each other's persona in relation to the transaction. However, these systems are often tightly bound with pseudonyms or other system-specific identifiers, they cannot be used across different systems. Similarly, such reputation systems are not generalized, and therefore are typically only suitable to one type of reputation (e.g. "email spammer," "hosts virus," "makes bad comments," "bad seller," "bad buyer," etc.). Further, these systems generally do not include verification mechanisms for reputation or real identities and the low cost to establish new pseudonyms and reputation leaves no incentive to maintain a clean reputation if that reputation is not transferred to newly established personae.

Reciprocity is the ability for each party in a transaction to report reputation-forming information (RFI) about the other parties in the transaction. Reciprocity provides an incentive for parties to improve the quality of the relationship and continue good behavior. Communities would benefit from reciprocal reputation systems that allow reputation information to be shared among communities while allowing the users to retain their anonymity within the communities.

SUMMARY

One embodiment is a method for providing reciprocity in a reputation system. The method comprises: responsive to receipt by a first entity of a Reputation Guarantee ("RG") request from a second entity, creating a token in accordance with specifications set forth in the RG request and forwarding the token to the second entity, wherein the token may include reputation information developed using reputation forming information ("RFI") of the second entity and policies concerning treatment of the RFI of the second entity; forwarding the token to a third entity by at least one of the first and second entities; responsive to the token received by the third entity not including the reputation information of the second entity: forwarding from the third entity to the first entity the token and an assertion request; and responsive to receipt of the token and the assertion request, forwarding by the first entity to the third entity an assertion including the reputation information in accordance with the policies concerning treatment of the RFI of the second entity.

DESCRIPTION OF THE DRAWINGS

FIGS. 3a and 3b collectively illustrate an embodiment of a system for providing for management of outstanding reciprocal reputation authorizations.

DETAILED DESCRIPTION

Figure 1:
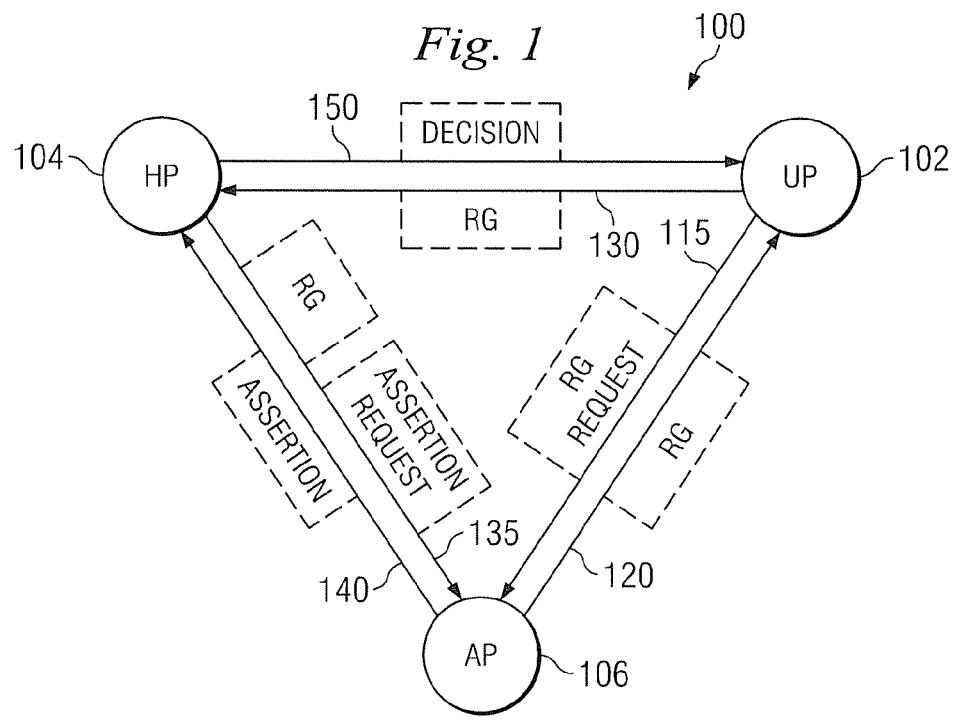
FIG. 1 illustrates an embodiment of a system for providing reputation services with anonymous identities.

A reputation reciprocity system may be modeled as a process in which one or more of the primary parties in a transaction include in the process an assertion by a third party concerning some matter of interest and a request to update reputation-forming information (RFI) held by the third party. RFI is reputation-related information submitted by a party to a reputation system, and such RFI may relate to the reputation of another party. For example, according to one embodiment, RFI captures reputation-related information about one party's experience with another party as the result of entering a transaction. One or more pieces of RFI may be considered by a reputation system when forming an assertion. Reputation information generally is any kind of information about an entity's reputation in a community and may include, without limitation, assertions, RFI, or other information related to an entity's reputation. Many different types of transactions are possible, and in each situation, different entities may fulfill more than one role.

In a typical situation, there are entities that wish to engage in a transaction. Such entitles are referred to herein as the (prospectively) transacting parties (TP). One or more of the TPs may be a hesitant party (HP), and one or more of the other TPs may be an unknown or unverified party (UP). A third party, the asserting party (AP), can provide an assertion as to the UP. The AP knows the identity of the UP, while the HP does not know the identity of the UP. The HP only knows the UP by a persona.

An assertion is generally defined as one or more statements of fact or opinion concerning the UP, based on RFI related to the UP. A requester requests the assertion, and a provider provides the assertion. One or more of the HPs can accept the assertion and become relying parties, thus possibly transforming UPs into provisionally trusted parties. Upon receiving the assertion, the HP evaluates the assertion. This evaluation may involve using the assertion directly as an input to the transaction (for example, continuing with the transaction, modifying the transaction, or aborting the transaction), or by processing the assertion to create an intermediate result (for example, a confidence estimate, applicability score, or strength value) that is then used as an input to the transaction.

If the HP and the UP enter into a transaction, then the HP may update the AP with RFI related to the HP-UP transaction. If the HP, the UP or the AP require reputation reciprocity, then such party may respond with its own RFI in response to the RFI update. Thus, a system for managing and providing anonymous reputation reciprocity services allows an UP to use an anonymous identity to transact with a HP where the HP relies on the assertions of an AP.

In some embodiments, one or more roles may be filled by community personas. Community personas are digital representations of actors that may not be traceable to actual real world identities. Community personas may also be known as pseudonyms, nicknames, unique identifiers, logins or identifiers. Community personas that have limited or no reputation data may be referred to as unverified accounts, non-authoritative identities, or non-attested identities. The AP is aware of the UP's identity and is able to reconcile multiple community personas with a single identity; however, other entities will not be able to ascertain UP's identity. This one-sided anonymity allows the UP to remain anonymous between communities. Further, the reputation reciprocity aspect of the embodiments allows UP to defend its reputation and dispel any misinformation. It should be understood that any of the roles described above can also be fulfilled through the use of an agent or proxy.

The roles described above are not mutually exclusive. In any given transaction, a party may fulfill any or all of these roles simultaneously or in turn. Several exemplary model reputation cycles will serve to illustrate different arrangements. Not all possible reputation cycles are described, and more than one model can be active at the same time in the same transaction. The embodiments described below are merely exemplary and are not meant to be limiting.

Various embodiments will be apparent to those skilled in the art. For example, some embodiments allow a product or service to act as a reputation proxy for the manufacturer or service provider. For example, a car maker's reputation is at least in part due to the reputation of each car and car line. The reputation data exchanged in a particular transaction may be segmented (for example, by product) to better refer to one aspect of a larger, more complex reputation. Similarly, a manufacturer or service provider may use its own reputation as a proxy for a product. For example, if a new product with no particular reputation is launched into the market, the provider of that product may substitute its own reputation for the non-existent product reputation. These and other embodiments, some of which are described below, are contemplated and inherent in the concepts described.

In describing selected embodiments, various objects or components may be implemented as computing modules. These modules may be general-purpose, or they may have dedicated functions such as memory management, program flow, instruction processing, object storage, etc. The modules can be implemented in any way known in the art. For example, in one embodiment a module is implemented in a hardware circuit comprising custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In another embodiment, one or more of the modules are implemented in software for execution by various types of processors. An identified module of executable code may, for instance, comprise one or more physical or logical blocks of computer instructions that may, for instance, be organized as an object, procedure, or function. Further, the executables of an identified module need not be physically located together, but may comprise disparate instructions stored in different locations that, when joined logically together, comprise the module and achieve the stated purpose for the module. A "module" of executable code could be a single instruction, or many instructions, and may even be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, merely as electronic signals on a system or network.

Another embodiment uses higher-level components as modules. For example, one module may comprise an entire computer acting as a network node. Another module may consist of an off-the-shelf or custom program, such as a database management system. These higher-level modules may be decomposable into smaller hardware or software modules corresponding to different parts of a software program and identifiable chips (such as memory chips, ASICs, or a CPU) within a computer.

Another type of module is a "network." A network module defines a communications path between endpoints and may comprise an arbitrary amount of intermediate modules. A network module can encompass various pieces of hardware, such as cables, routers, and modems, as well the software necessary to use that hardware. Another network module encompasses system calls or device-specific mechanisms such as shared memory, pipes, or system messaging services. Another network module uses calling conventions within a computing module, such as a computer language or execution environment. Information transmitted using the network module may be carried upon an underlying protocol, such as HTTP, BXXP, or SMTP, or it may define its own transport over TCP/IP, IPX/SPX, Token Ring, ATM, etc. To assure proper transmission, both the underlying protocol as well as the format protocol may split the information into separate pieces, wrap the information in an envelope, or both. Further, a network module may transform the data through the use of one or more computing modules.

What constitutes a "party" or an "entity" may vary between embodiments. In one embodiment, the parties may be people interacting with the system. In another embodiment, the parties may be different systems that need to interact in an arm's-length transaction. Another embodiment may use computing modules as parties. Yet another embodiment may use more than one type of entity in the same transaction, i.e., a combination of the above noted exemplary entities.

The implementation of "sending" or "transmitting" information varies between embodiments. For example, one embodiment uses XML-formatted textual protocols such as SOAP, SAML, or XML-RPC to send RFI and/or requests. Another embodiment uses a free-form textual protocol. Another embodiment uses a binary protocol such as COM, CORBA/IIOP, or an object serialization scheme like Java RMI.

An implication of the reciprocal reputation model is that reputation is rooted in identity. However, those skilled in the art will appreciate that the concept of an "identity" is broader than an authenticated identity, as an identity may be anonymous, pseudonymous, or part of a group. One embodiment, for example, uses a cryptographic protocol wherein different communities know entities only by personas. Each entity can hold multiple personas, and different personas of the same entity cannot be linked. However, a system can issue a credential to a persona, and the corresponding entity can prove possession of that credential to another system (who knows that entity by a different persona), without revealing anything more than the possession of the credential. Any identity protocol known in the art may be used. Other embodiments use other protocols that allow, for example, revocable anonymity, individual anonymity within an identified group, and "confirmed" identity (a protocol where a semi-trusted third party is required to confirm a particular signature). Other methods may also be used, such as a possession-based identity (for smart cards, PINs, etc.) and biometric-based identity.

Some portions of the embodiments of the embodiments are described as "signed." What constitutes an adequate signature can vary between embodiments, as can the method of signing. Any signing protocol known in the art can be used, but the strength and quality of the guarantees made by the different signing protocols may vary. In general, the adequacy of a given signing method varies according to the ontology of the information provided. For example, one embodiment uses public/private key signing to make certain guarantees about the identities of the various parties, as described above. Another embodiment uses a one-way hash to make guarantees about some content. For example, one embodiment uses a secure date time stamping algorithm to indicate the last time a certain piece of content was changed. Another embodiment uses a cryptographic signature to guard against later changes in some piece of content. Another embodiment uses a public/private key infrastructure to guarantee that a particular person created or distributed a particular piece of content. Yet another embodiment uses a computing module to provide key generation, random number generation, or signing services. In general, an embodiment may use a signing protocol to bind an arbitrary assertion to a piece of content. Further embodiments mix multiple signing protocols within the same cycle. An evaluation function may take the signing protocol into account when determining the overall value to assign to an assertion.

FIG. 1 illustrates an embodiment of a reciprocal reputation cycle 100. A first entity 102 and a second entity 104 are TPs. The first entity 102 is a UP; the second entity 104 is a HP. A third entity 106 is an AP. The AP 106 knows the identity of the UP 102; however, the HP 104 may not know the identity of the UP.

The AP 106 maintains reputation history for entities in many contexts, and allows authenticated identities to authorize release of reputation information, or authorize RFI updates in a given context. Further, the AP 106 provides services to manage outstanding authorizations.

In some embodiments, the AP 106 could be one or more APs 106 that collectively manage reputation information for multiple entities. In such an embodiment, the assertion received from the AP 106 might be based on an aggregate or subset of RFI collected by several assertion providers. In another embodiment, the UP 102 or the HP 104 may receive assertions from more than one AP 106. In such an embodiment, the UP 102 or HP 104 may weigh assertions from a certain AP 106 more heavily than assertions from other APs 106. Additionally, in some embodiments, the UP 102 and the AP 106 may be a single entity; however, because independence may be an important trait with respect to an AP 106, embodiments where the UP 102 and the AP 106 are a single entity may be rare. The UP 102, the HP 104 and the AP 106 are described as separate entities in the present description of the embodiments purely for conceptual clarity and such conceptual separation should not be construed as a limitation. The interactions between the entities depicted in the embodiments described herein may be semi-automated or fully automated, requiring minimal interaction by any human, depending on the assurances offered and required.

The UP 102, such as an individual, corporation, organization, etc., may want to interact with the HP 104. Before the HP 104 transacts with the UP 102, the HP 104 may want to evaluate the UP's 102 reputation information. The following scenario describes an embodiment of the present disclosure. UP 102 contacts HP 104 to establish a community persona (not shown), such as an account username or some other identifier. The HP 104 might require the UP 102 to provide certain contextual reputation information before allowing the UP 102 to conduct certain transactions with the HP 104. In another embodiment, the HP 104 might require that the UP 102 specify an AP 106 who can provide such contextual reputation information. In yet another embodiment, if the HP 104 is aware of the UP's 102 identity, the HP 104 may retrieve such contextual reputation information from an AP 106 of its choice. Reputation information may include reputation policy information and/or RFI. Policy information relates to various policies that the UP 102 maintains with respect to providing reputation information. For example, policy information may include, without limitation, a reputation reciprocity policy, a revocation policy and an expiration policy. It should be understood that in the preceding discussion and in the discussion of embodiments that follow, that the terms UP 102, HP 104, and AP 106 to describe the parties in a reputation transaction are merely exemplary embodiments, and the parties described in the discussion of embodiments of the present disclosure are not restricted to the roles and actions described herein.

As illustrated in FIG. 1, a Reputation Guarantee (RG) may be exchanged between parties as part of a transaction. In one embodiment, an RG may be a token that one party provides to another party upon initiating a reputation transaction. The RG facilitates reputation reciprocity, by providing a mechanism for tying multiple community personas to a single identity, and controlling how and when parties may submit RFI. For example, as shown in FIG. 1, the UP 102 may request an RG from the AP 106, and pass the RG to a HP 104. The HP 104 and UP 102 may then transmit the RG along with RFI submissions to an AP 106.

A reciprocal reputation policy may require that an entity performing a RFI update allow for a reciprocal RFI update by the subject of the RFI update. For example, the UP 102 might require that it have the ability to provide RFI to the AP 106 in response to any RFI updates by the HP 104. A reciprocal reputation policy may be enforced either by the UP 102, the AP 106, or by both the UP 102 and the AP 106. Therefore, the reciprocal reputation policy may also identify the entity or entities that will enforce the policy. The reciprocal reputation policy according to one embodiment indicates to other parties the reputation policies that an entity will enforce. In one embodiment, the reciprocal reputation policy informs the other parties as to what information is necessary.

A revocation policy may include certain constraints on revoking authorization to retrieve reputation information or update RFI. For example, one constraint might be that an RG grantor cannot revoke an authorization until after a certain time period. In one embodiment, upon receiving a revocation request from an RG grantor, the AP 106 will acknowledge the request, but will not make the revocation request effective until all constraints on revoking authorization are met. Alternatively, the AP 106 may refuse the revocation request and require the RG grantor to make the revocation request again once the revocation policy constraints have been met.

An expiration policy may define certain restrictions on how long an authorization is valid for certain reputation transactions. It is anticipated that separate expiration policies may be defined for the authorization to retrieve RFI and for the authorization to update RFI. An expiration may be durational or may be based on some other metric, such as access count. In one embodiment, an RG grantor may authorize an RG grantee to retrieve reputation information a defined number of times or for a defined period of time, and the RG grantor may authorize the RG grantee to update RFI for the same or a different duration or number of times.

To satisfy the reputation requirements of a party in a transaction, UP 102 may request an RG from the AP 106, as reflected by arrow 115. As part of the RG request, the UP 102 provides the AP 106 with the HPs 104 reputation requirements. The HPs 104 reputation requirements may include, without limitation, reputation retrieval mechanisms, reputation modification mechanisms, durations, revocation limitation, transaction ID, etc.

Further, as part of the RG request, the UP 102 also provides AP 106 with information about the scope of reputation information the HP 104 is allowed to access with the RG. For example, if the HP 104 requires the UP 102 to provide a reputation feedback mechanism for an article submission ontology, then the UP 102 might desire to limit HPs 104 access to article submission RFI. The UP 102 probably would not want to allow HP 104 to retrieve other types of RFI, such as RFI related to the UPs 102 social or commercial ontology.

As part of the RG request, the UP 102 might also provide AP 106 with restrictions with respect to RFI updates by UP 102. For example, if the transaction between the UP 102 and the HP 104 relates to the UPs 102 submission to the HP 104 of an editorial for publication, then the UP 102 might want to restrict the HPs 104 ability to update RFI to the editorial ontology. The UP 102 probably would not want to give the HP 104 the ability to update RFI about the UPs 102 social or commercial ontology.

The RG request may include authentication of the UP 102 by the AP 106. Authentication can be direct or through an agent of the UP 102, or an automated process, using any authentication protocol known in the art. Optionally, the AP 106 might require the UP 102 to prove that the UP 102 is using a particular persona with respect to the HP 104. For example, the HP 104 could provide credentials that allow the AP 106 to authenticate with the HP 104 as the persona. In another embodiment, the UP 102 could provide the AP 106 with a certificate or token from the HP 104 that the UP 102 is using the persona with respect to the HP 104. In yet another embodiment, the AP 106 sends the RG to the HP 104 after the AP 106 receives community persona information, such as a certificate or token, from the HP 104. Receiving community persona information from the HP 104 allows the AP 106 to confirm that an UP 102 is not attempting to create a false reputation by masquerading under a different community persona. In another embodiment, the HP 104 may require that the AP 106 assert that a particular UP 102 community persona is the only persona for which the AP 106 will allow the submission of certain contextual reputation information from the HP 104.

After the AP 106 authenticates the UP 102, the AP 106 issues an RG to UP 102, as shown by arrow 120. The RG, may then be passed on to the HP 104. According to one embodiment, the RG is a signed confirmation that the HP account at AP has been granted the required authorizations. The RG allows a possessing entity to retrieve reputation information in accordance with any limitations specified within the RG. Further, the RG might also allow the possessing entity to update RFI in accordance with any limitations specified within the RG. In addition, the RG may also include other reputation information, such as the UPs 102 reputation policies. Alternatively, in another embodiment, the AP 106 sends the token directly to the HP 104.

A RG, as used herein, is generally a descriptor of information that includes any combination and number of possible components, and may be anonymous. That is, a RG does not necessarily contain any information about the identity of UP 102. If a RG is anonymous, then the HP 104 will not be able to determine the identity of UP 102 using the RG. However, the AP 106 is able to determine UPs 102 identity using the RG. Further, the RG might be signed by the AP 106. RGs are discussed in more detail in the discussion of FIG. 4 below.

UP 102 then communicates with HP 104 as indicated by arrow 130, and forwards the RG to the HP 104. In one embodiment, the AP 106 includes all or some reputation information in the RG. The RG may be either encrypted or unencrypted. If the RG is unencrypted, then the HP 104 can extract such reputation information from the RG without assistance from AP 106. If the RG is encrypted, then the HP 104 obtains a key from the AP 106 or the UP 102 to decrypt the reputation information.

In another embodiment, the AP 106 does not include reputation information with the RG. Instead, the AP 106 requires that the HP 104 send an assertion request to the AP 106 along with the RG, as illustrated by arrow 135. Upon the HP's 104 submission of an RG, the AP 106 validates the signed RG. If validation succeeds, the AP 106 provides an assertion to HP 104, as illustrated by arrow 140. In one embodiment, the assertion is encrypted, and may only be decrypted by the final recipient. Encryption, according to one embodiment may comprise Public Key Infrastructure (PKI) technology, thus obviating any need to exchange encryption and decryption keys between the parties.

HP 104 then analyzes the reputation information to determine whether it wants to allow the transaction with UP 102. As illustrated by arrow 150, HP 104 responds to UP 102 with a decision to either allow, disallow or modify the transaction. The HPs 104 evaluation of the reputation information may include determining whether the reputation information satisfies the HPs 104 reputation information requirements. The HP 104 might also take into consideration whether the UPs 102 reputation policies are acceptable.

It should be understood that the AP 106 may also have an associated reputation based on many factors. Some of these factors might include, without limitation, how rigorously the AP 106 confirms the identity of real world entities, how well privacy information is safeguarded, the efficiency and reliability of the services provided, and the extent to which RFI is shared with other reputation authorities. The UP 102 might evaluate the AP's 106 reputation when deciding whether to utilize the AP 106 as the UP's 102 assertions provider. Likewise, the HP 104 might evaluate the AP's 106 reputation when determining to what extent the HP 104 should rely on the AP's 106 assertions. Thus, the HPs 104 evaluation of reputation information may also consider the reputation of the AP 106 and the sources of RFI upon which the reputation of the AP 106 is based.

The AP 106 may express a confidence level associated with certain factors. For example, the AP 106 may provide a HP 104 with the AP's 106 confidence level in a UP 102. The AP 106 may also provide the HP 104 with the AP's 106 confidence level in the information that the AP 106 is providing to the HP 104. For example, according to one embodiment, the AP 106 may possess information about both anonymous entities and confirmed entities. The AP 106 may have a higher confidence level with respect to the information about the validated entities than the anonymous entities, and could share such confidence levels with the HP 104. Accordingly, the HP 104 may evaluate the AP's 106 confidence levels when evaluating assertions.

Figure 2:
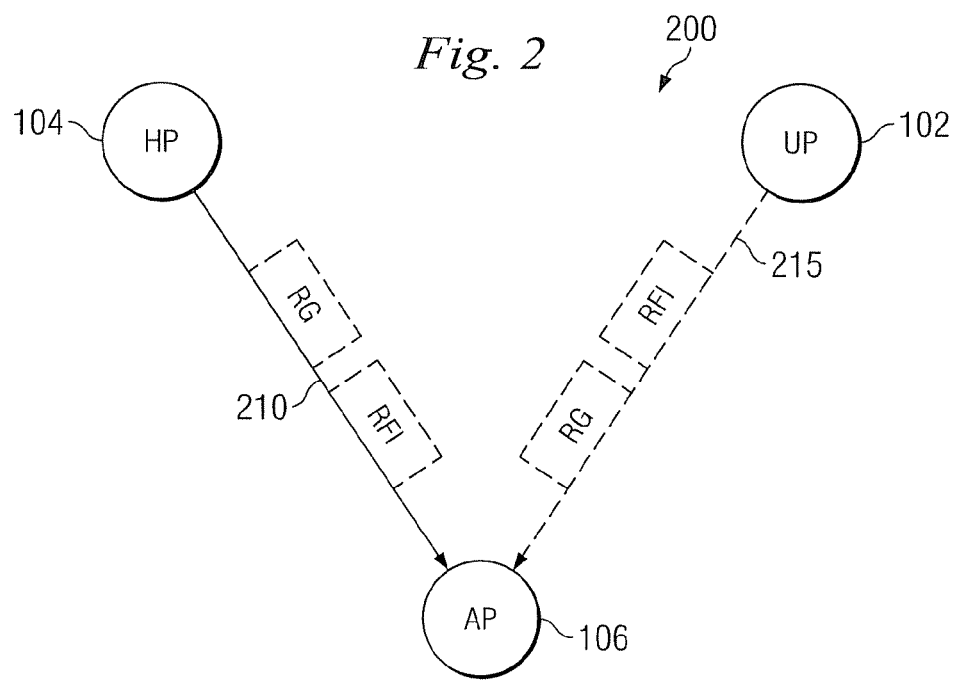
FIG. 2 illustrates another embodiment of a system for providing reciprocal reputation services with anonymous identities.

Referring now to FIG. 2, illustrated is an embodiment 200 of a method implementing a reciprocal reputation policy. As background to discussion of FIG. 2, assume that the HP 104 received at a prior time an RG from the AP 106 of some other trusted party. Further assume that the HP 104 and the UP 102 have completed a transaction, and that the HP 104 now wants to submit an RFI update to the AP 106 with respect to the transaction. As illustrated by arrow 210, the HP 104 submits to the AP 106 a RFI update along with the RG to the AP 106. If the RG includes a reciprocal reputation policy, then the UP 102 may in turn respond to any RFI submitted by the HP 104 with the UPs 102 own RFI update.

As illustrated by arrow 215, in one embodiment, the UP 102 sends AP 106 an RG along with RFI responding to HPs 104 RFI update. The RG used by the UP 102 could be a copy of the RG used by the HP 104 or it could be a different RG. In another embodiment, at the time the HP 104 submits RFI to the AP 106, the HP 104 also sends a new RG created by the HP 104 to both the AP 106 and the UP 102. The UP 102 submits the new RG to the AP 106 when responding to HPs 104 RFI, and the AP 106 compares the UPs 102 submitted RG with HPs new RG before allowing UPs 102 RFI update. In yet another embodiment, the AP 106 generates a new RG when HP 104 submits RFI, and the AP 106 sends the new RG to the UP 102. The UP 102 may then submit the new RG to the AP 106 at a later time to respond to HPs 104 RFI.

Referring now to FIG. 3a, illustrated is an embodiment 300 of a method of implementing a revocation policy. The HP 104 may have defined a revocation policy as part of an RG. According to one embodiment, the HP 104 may specify an effective revocation policy date (i.e. when the revocation policy take effect), an expiration revocation policy date, or other required HP 104 input parameters that must be satisfied before revocation becomes effective. Upon receiving the revocation policy, the AP 106 may then store the revocation policy. In one embodiment of the method 300, a UP 102 no longer wants HP 104 to have access to its reputation information. As reflected by arrow 310, UP 102 effects the revocation by authenticating with AP 106 and submitting a revocation request along with an RG. AP 106 will then check the revocation policy, and determine whether the UP's 102 revocation request complies with the revocation policy. If the revocation request complies with the revocation policy, then the AP 106 will revoke the authorization in accordance with any applicable revocation policy. In another embodiment, if the revocation request does not comply with the revocation policy, then the AP 106 will deny the revocation request. In yet another embodiment, the AP 106 may notify the UP 102 that the revocation request has been received, and will be processed pending the HP's 104 approval. The AP 106 then notifies HP 104 of the revocation, as illustrated by arrow 315. This notification may occur immediately or at some future effective revocation date, as governed by the revocation policy. Optionally, the UP 102 may notify HP 104 of the revocation, as illustrated by arrow 320. Upon receipt of the notification, HP 104 makes business decisions with respect to UPs 102 community persona. For example, the HP 104 might decide to disable the account of UP 102, remove any content associated with UP 102, or take other actions.

In another embodiment 324 of a method implementing a revocation policy, illustrated by FIG. 3b, UP 102 sends an immediate revocation request to AP 106, as illustrated by arrow 325. UP 102 attempts to transact with HP 104, as illustrated by arrow 330. HP 104 then attempts to send an assertion request to AP 106 by submitting an RG to AP 106, as shown by arrow 335. In response to receipt of the assertion request from HP 104, AP 106 refuses the RG, and notifies HP 104 that UP 102 has exercised the revocation policy, as shown by arrow 340. The embodiment 324 illustrated by FIG. 3b is not mutually exclusive with respect to the previous embodiment 300 illustrated by FIG. 3a.

Figure 4:
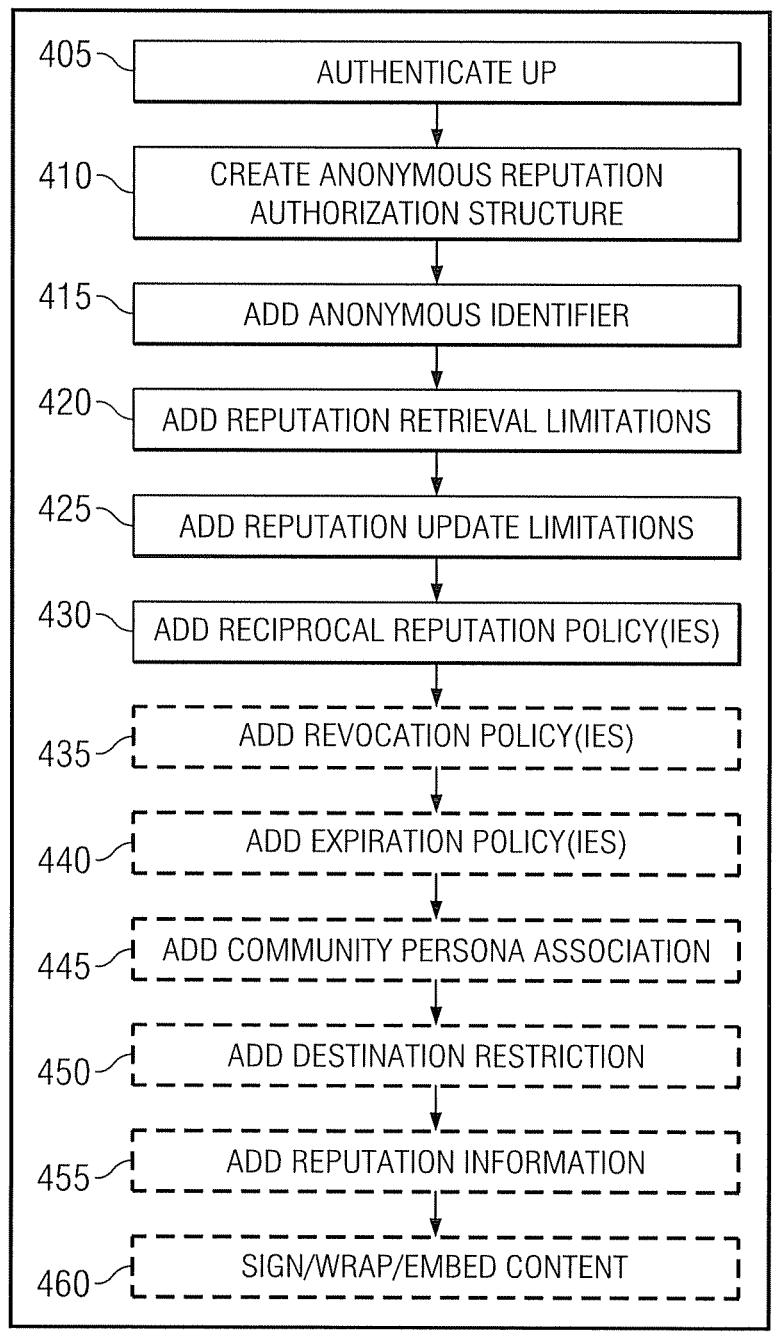
FIG. 4 is a flowchart illustrating one embodiment of a method for creating an anonymous signed Reputation Guarantee.

FIG. 4 is a flowchart illustrating one embodiment of a method 400 for creating an anonymous RG. At step 405, the UP 102 authenticates with the AP 106 and requests an RG. Authentication can be direct or through an agent of the UP 102 or an automated process using any authentication protocol known in the art.

At step 410, the AP 106 creates the RG structure to which designated pieces of information will be added. This structure may be defined at a binary level as a struct, class, or other construct, or it may be defined at a higher level in a binary, ASCII, or text construct. The structure may also be XML-formatted or a variant thereof having an ontology defining the relationships between the different fields maintained in a DTD, XML Schema, RelaxNG, or similar document.

At step 415, an opaque identifier is added to the structure. The AP 106 can use the opaque identifier to correlate an RG with an entity identity and/or entity persona. The opaque identifier may also be used for other reasons, such as to identify a particular transaction among the UP 102 and the HP 104. The opaque identifier is one mechanism for maintaining the anonymity of the UP 102 between communities. According to one embodiment, the opaque identifier may be a cardspace Private Personal Identifier (PPID). According to a second embodiment, the opaque identifier may be a liberty alliance persona. In yet another embodiment, the opaque identifier may be a unique identifier that is based on a persona, a session, a transaction or a recipient. Although the AP 106 can use the opaque identifier to identify the UP 102, other entities cannot use the opaque identifier to correlate the opaque identifier to an entity identity and/or entity persona. In one embodiment, the opaque identifier is a single-use identifier. A single-use identifier prevents entities, other than the AP 106, from using the opaque identifier as a mechanism for linking two identities by virtue of a common key. In another embodiment, the opaque identifier, the communication channel, the entire message, and/or parts of the message may be encrypted so that only the AP 106 may decrypt the encrypted elements.

At step 420, reputation information retrieval limitations are added to the structure. These limitations define the access restrictions that will apply to the use of the RG when retrieving reputation information. Any contextual limitations placed on reputation information retrieval are included in this step as well as any limitation on the level of reputation information that may be retrieved.

At step 425, reputation update limitations are added to the structure. These limitations define the restrictions that will apply to the use of the RG when updating and adding RFI. For example, any contextual limitations placed on RFI updates are included in this step as well as any other constraints for updating and adding RFI.

At step 430, one or more reciprocal reputation policies are added to the structure. This policy defines the reciprocal reputation requirements that flow from any RFI updates. An RFI update may include, without limitation, changes to existing RFI and the addition of new RFI.

At step 435, one or more optional revocation policies may be added to the structure. This policy defines the conditions under which any authorization to access or update reputation information may be revoked by the UP 102.

At step 440, one or more expiration policies may optionally be included in the structure. Expiration policies define the expiration of any authorization to access or update reputation information after the specified expiration has occurred.

At step 445, a community persona associated with the HP 104 may be added to the RG to allow an AP 106 to associate a persona with assertion requests and/or RFI updates. Multiple community personas could be included in this step.

At step 450, destination restrictions may optionally be included in the RG. Such restrictions may include, for example, identification of entities authorized to use the RG for retrieval of reputation information and/or updates of RFI. Such information may be included directly in the RG or may merely be a reference that the AP 106 uses when validating assertion requests or RFI updates. Multiple destination restrictions may be included in a single RG.

The various restrictions described above in steps 420, 425, 430, 435, 440, 445, 450, and 455 may be gathered from various sources and submitted as part of an RG. In a second embodiment, the restrictions described above may not be submitted as part of an RG. Instead, such restrictions may be stored by an RG-granting authority. Storing such restrictions at the RG-granting authority may prevent unauthorized tampering of restrictions by outside parties.

At step 455, reputation information may be optionally included in the RG. Inclusion of reputation information in the RG obviates the step of the RG-holder contacting the AP 106 with an assertion request.

At step 460, the RG content is optionally signed, encrypted, wrapped with additional information, or embedded in other content as desired by the AP 106. The AP 106 may use any method known in the art to create and deliver anonymous RGs.

An RG may take various forms. RGs may be defined by an ontological language such as RDF, RDFS, OIL, DAML, DAML+OIL, OWL, KIF, CycL, etc., or by other schema-conforming extensible markup languages such as XML, SGML, XHTML, etc., or may be in encrypted binary form. It is anticipated that RGs may also contain combinations of forms and may use a proprietary format as desired by the AP 106. RGs may contain varied levels of content—the embodiment illustrated in FIG. 4 is in no way to be construed as limiting. It merely illustrates one possible construction of an opaque signed RG that enables entities to participate in the transactions described in the present disclosure. That is, an opaque signed RG described above enables a UP 102 to anonymously participate in multiple communities, and for an HP 104 to receive reputation information from an AP 106 without knowing the UP's 102 identity.

As a final effort to explain and describe possible embodiments of the present disclosure, a few additional embodiments follow. In the first embodiment, John Q. Public (UP 102) wishes to join a moderated message board (HP 104). When signing up to the board, John is required establish a community persona. John may not be required to reveal his true identity or any other personally-identifying information. However, as part of the registration process, John is also required to provide the board with authorization to retrieve contextual reputation information regarding John's activities on message boards. Further, the board requires John to authorize the board to update John's RFI on the reputation system, thereby allowing the board to report any of John's misdeeds on the board. In the case of a message board, this retrieval authorization might be limited to a single query as it is only used to determine whether John will be allowed to join and/or post content.

To satisfy the policy of the message board, John contacts his chosen reputation system (AP 106) and requests that authorizations be granted to the message board. Depending on what reputation information is required by the message board, John may choose what to allow in the authorizations, including the scope of the retrieval authorization and the scope of the update authorization. John may also include any requirements for reciprocal reputation feedback that he requires for anyone that posts reputation feedback to his profile. John may also choose the level of detail that should be returned in response to any requests for reputation information, including more detail perhaps for any blemishes that may appear in his history. Instead of defining the reputation policies himself, John may provide his chosen reputation system with references that the reputation system may contact to retrieve the required information.

The reputation system then provides John with an RG. The RG may or may not be opaque depending on the reputation system. John then provides the RG to the message board. The message board then submits the RG to John's reputation system along with an assertion request. After the reputation system validates the RG, it returns an assertion to the message board. The message board then determines whether reputation information in the assertion satisfies the board's requirements. If the message board determines that the reputation information is satisfactory, the message board allows John to begin posting messages to the message board. John then participates for a period of time as a good citizen, but eventually John violates the message board's service agreement by posting suggestions on how to perpetrate a crime. In response, the message board administrators disable John's persona and update John's RFI with his reputation system to reflect this poor behavior.

Subsequently, John tries to establish another persona with the message board. However, when John provides the authorization to retrieve his RFI related to message boards, the message board provider discovers his past misdeeds and does not allow John to establish a new persona.

In another embodiment, John (UP 102) joins a community content site (HP 104) and provides an anonymous RG from his chosen reputation system (AP 106) allowing access to his reputation information for behavior at similar sites. Thereafter, when John wishes to submit content to the site, he is required to attach an RG containing an authorization to add to his RFI. In this scenario, John wants the ability to respond to any feedback left for him, so he includes a reciprocal reputation policy in his authorization. Subsequently, if John posts information that is plagiarized or contains unverifiable information, community members can use the RG associated with the posting to report that John has problems with intellectual integrity.

For example, if Susie discovers that John posted a plagiarized article, Susie could then send a RFI update request to the reputation system along with the RG to report the conduct. Since John included a reciprocal reputation policy, Susie must provide John with an RG which will allow John to respond to Susie's post at the time Susie sends her RFI update. John could then use Susie's RG to respond to Susie's RFI, and address Susie's plagiarism accusations. It should be noted that in this embodiment, John's response to Susie's RFI may be limited to a response to the plagiarism accusations, and that the response does not directly affect Susie's own general reputation. Instead, in this embodiment, John's response only affects Susie's reputation as it pertains to detecting plagiarism.

In another embodiment, John (UP 102) joins a dating website (HP 104). Upon registration, John provides the dating website with an anonymous signed RG that he was issued from his chosen reputation system (AP 106). This RG authorizes the dating website to retrieve John's reputation information in the context of dating. As John sets up dates through the website, each party must provide reputation feedback mechanisms as well as authorization to retrieve reputation information related to dating. After the dates conclude and the parties provide feedback, the feedback is available for future parties examine John's reputation as a potential date.

In yet another embodiment, some communities (HP 104) may require that new members (UP 102) provide reputation update mechanisms for a probationary period of time and then rely on moderators to police "tenured" members of the community. In this embodiment, the authorization submitted by a new member to the community would contain an expiration policy for the associated authorizations.

According to another embodiment, an embodiment of the present disclosure may be used to control unsolicited communications. For example John signs up for a "Do Not Call" list. Despite being on the "Do Not Call" list, John may still receive occasional unsolicited phone calls. According to one embodiment, John may require that only callers that meet a certain reputation threshold be allowed to call him. John may also require reputation reciprocity so that he can report negative reputation with respect to certain callers that abuse the "Do Not Call" system. Certain callers may also require reputation reciprocity so that such callers may respond to John's reputation reports.

The mutual RG system described in the "Do Not Call" list scenario above may also be used to prevent unauthorized incoming messages that are received via email, instant message (IM), or short message service (SMS). For example, mobile device users are often billed for any incoming messages. A mutual RG system may be used to block messages from any senders that do not meet certain reputation requirements, or who do not allow a reciprocal reputation policy. Requiring a reputation threshold and providing a means for a user to provide reciprocal reputation could help prevent scams where a third party, without the mobile device user's consent, signs the user up for a premium text messaging service which then sends messages that are billed to the user.

Those skilled in the art will readily understand that the embodiments set forth herein are applicable to host of different applications. Any social interaction that requires trust may implement embodiments of the present disclosure, allowing users to preserve real world anonymity while remaining responsible for the consequences of misdeeds. Embodiments of the present disclosure also allow users to partition their reputation so that reputation with respect to one context does not affect reputation of another context. It is anticipated that the embodiments of the present disclosure contained herein could be used in social contexts, such as with social networking websites. These embodiments can also be used in the context of semi-authoritative information, such as websites that allow user-contributed content. Further, these embodiments can be used with reporting sites and news aggregators and social bookmarking sites. Dating sites could also benefit from embodiments of the present disclosure. Sites containing consumer-driven rankings of products and services could likewise benefit, as could vendor relationship management (VRM) systems where a consumer wishes to request services, but vendors do not want to waste time responding to bogus requests. Sites having expert answers or advice would also benefit from embodiments of the present invention, as would sites involving the buying and selling of goods and services. In sum, numerous digital service communities could benefit from the novel features of the invention described herein.

It is understood that several modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

Although the present disclosure has described embodiments relating to specific commodity environments, it is understood that the apparatus, systems and methods described herein could applied to other environments.

Any spatial references used herein, such as, "upper," "lower," "above," "below," "between," "vertical," "horizontal," "angular," "upward," "downward," "side-to-side," "left-to-right," "right-to-left," "top-to-bottom," "bottom-to-top," "left," "right," etc., are for the purpose of illustration only and do not limit the specific orientation or location of the structure described above. Additionally, in several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

What is claimed is:

1. A method for providing reciprocity in a reputation system, the method comprising:
responsive to receipt by a computer of a first entity of a Reputation Guarantee ("RG") request from a second entity, creating a token in accordance with specifications set forth in the RG request and forwarding the token to the second entity, wherein the token may include reputation information developed using reputation forming information ("RFI") of the second entity and policies concerning treatment of the RFI of the second entity, wherein the reputation information includes information about an experience of a fourth entity in performing a transaction with the second entity, and wherein the second entity is an unknown party;
forwarding the token to a third entity by at least one of the first and second entities;
responsive to the token received by the third entity not including the reputation information of the second entity:
forwarding from the third entity to the first entity the token and an assertion request; and
responsive to receipt of the token and the assertion request, forwarding by the first entity to the third entity an assertion including the reputation information in accordance with the policies concerning treatment of the RFI of the second entity.

2. The method of claim 1 further comprising:
forwarding from the third entity to the first entity the token and additional RFI concerning the second entity; and
the first entity updating the RFI of the second entity with the additional RFI forwarded from the third entity in accordance with the policies concerning treatment of the RFI of the second entity.

3. The method of claim 2 further comprising:
forwarding from the second entity to the first entity the token and additional RFI concerning the third entity; and
the first entity updating the RFI of the third entity with the additional RFI forwarded from the second entity in accordance with the policies concerning treatment of the RFI of the third entity.

4. The method of claim 3 wherein the forwarding from the second entity to the first entity the token and additional RFI concerning the third entity is performed responsive to the forwarding from the third entity to the first entity the token and additional RFI concerning the second entity.

5. The method of claim 1 further comprising:
responsive to receipt by the first entity of a request to revoke authorization to provide the reputation information, determining by the first entity whether the request to revoke authorization complies with a revocation policy specified in the token; and responsive to a determination that the request to revoke authorization does not comply with the revocation policy, refusing to revoke authorization to receive the reputation information; otherwise, revoking authorization to receive the reputation information.

6. The method of claim 5 further comprising subsequent to the revoking, providing a revocation notice to the third entity.

7. The method of claim 1 further comprising:

responsive to receipt by the first entity of the token and the assertion request from the third entity, determining by the first entity whether the assertion request complies with an expiration policy specified in the token; and responsive to a determination that assertion request does not comply with the expiration policy, denying the third entity's assertion request.

8. The method of claim 1 further comprising:

responsive to receipt by the first entity of the token and the assertion request from the third entity, determining by the first entity whether the assertion request complies with an expiration policy specified in the token; and responsive to a determination that the assertion request does not comply with the expiration policy, denying the third entity's assertion request.

9. The method of claim 1, wherein the second entity is an anonymous entity.

10. A system, comprising:

a network coupling first, second and third entities, wherein the first entity is adapted to:

responsive to receipt by a first entity of a Reputation Guarantee ("RG") request from a second entity, creating a token in accordance with specifications set forth in the RG request and forwarding the token to the second entity, wherein the token may include reputation information developed using reputation forming information ("RFI") of the second entity and policies concerning treatment of the RFI of the second entity, wherein the reputation information includes information about an experience of a fourth entity in performing a transaction with the second entity, and wherein the second entity is an unknown party;

forwarding the token to a third entity by at least one of the first and second entities;

responsive to the token received by the third entity not including the reputation information of the second entity:

forwarding from the third entity to the first entity the token and an assertion request; and responsive to receipt of the token and the assertion request, forwarding by the first entity to the third entity an assertion including the reputation information in accordance with the policies concerning treatment of the RFI of the second entity.

11. The system of claim 10 further comprising:

forwarding from the third entity to the first entity the token and additional RFI concerning the second entity; and the first entity updating the RFI of the second entity with the additional RFI forwarded from the third entity in accordance with the policies concerning treatment of the RFI of the second entity.

12. The system of claim 11 further comprising:

forwarding from the second entity to the first entity the token and additional RFI concerning the third entity; and the first entity updating the RFI of the third entity with the additional RFI forwarded from the second entity in accordance with the policies concerning treatment of the RFI of the third entity.

13. The system of claim 12 wherein the forwarding from the second entity to the first entity the token and additional RFI concerning the third entity is performed responsive to the forwarding from the third entity to the first entity the token and additional RFI concerning the second entity.

14. The system of claim 10 further comprising:

responsive to receipt by the first entity of a request to revoke authorization to provide the reputation information, determining by the first entity whether the request to revoke authorization complies with a revocation policy specified in the token;

responsive to a determination that the request to revoke authorization does not comply with the revocation policy, refusing to revoke authorization to receive the reputation information; otherwise, revoking authorization to receive the reputation information; and subsequent to the revoking, providing a revocation notice to the third entity.

15. The system of claim 10, wherein the second entity is an anonymous entity.

16. A method for providing reciprocity in a reputation system, the method comprising:

receiving by a computer of a first entity of a Reputation Guarantee ("RG") request from a second entity, wherein the second entity is an unknown party;

creating a token in accordance with specifications set forth in the RG request, wherein the token may include reputation information developed using reputation forming information ("RFI") of the second entity and policies concerning treatment of the RFI of the second entity, and wherein the reputation information includes information about an experience of a fourth entity in performing a transaction with the second entity;

forwarding the token to the second entity;

receiving by the computer of the first entity the token and an assertion request from a third entity; and forwarding to the third entity an assertion including the reputation information in accordance with the policies concerning treatment of the reputation forming information ("RFI") of the second entity.

17. The method of claim 16 further comprising:

receiving by the computer of the first entity additional RFI concerning the second entity from the third entity; and updating the RFI of the second entity with the additional RFI received from the third entity in accordance with the policies concerning treatment of the RFI of the second entity.

18. The method of claim 17 further comprising:

receiving by the computer of the first entity the token and additional RFI concerning the third entity from the second entity; and updating the RFI of the third entity with the additional RFI forwarded from the second entity in accordance with the policies concerning treatment of the RFI of the third entity.

19. A method for providing reciprocity in a reputation system, the method comprising:

receiving by a computer of a third entity a token from a second entity, wherein the second entity is an unknown party;

forwarding the token and an assertion request to a first entity, wherein the token may include reputation information developed using reputation forming information ("RFI") of the second entity and policies concerning treatment of the RFI of the second entity, and wherein the reputation information includes information about an experience of a fourth entity in performing a transaction with the second entity; and receiving an assertion including reputation information about the second entity in accordance with the policies concerning treatment of the reputation forming information (RFI) of the second entity.

20. The method of claim 19 further comprising forwarding the token and additional RFI concerning the second entity to the first entity.

* * * * *